J. B. SWEET.
SHAKER.
APPLICATION FILED MAR. 21, 1921.
1,411,594.
Patented Apr. 4, 1922.
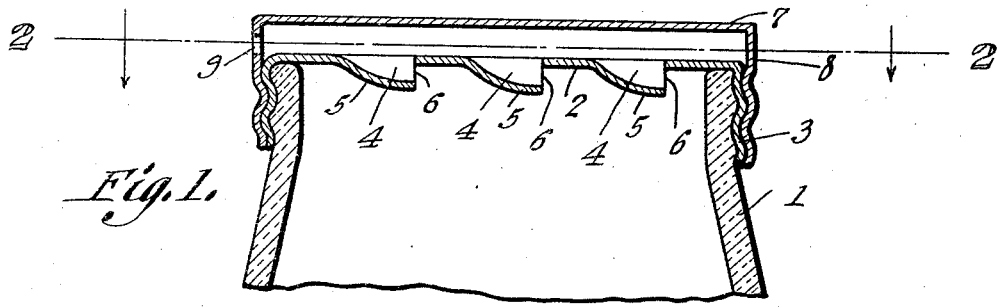
Fig. 1.
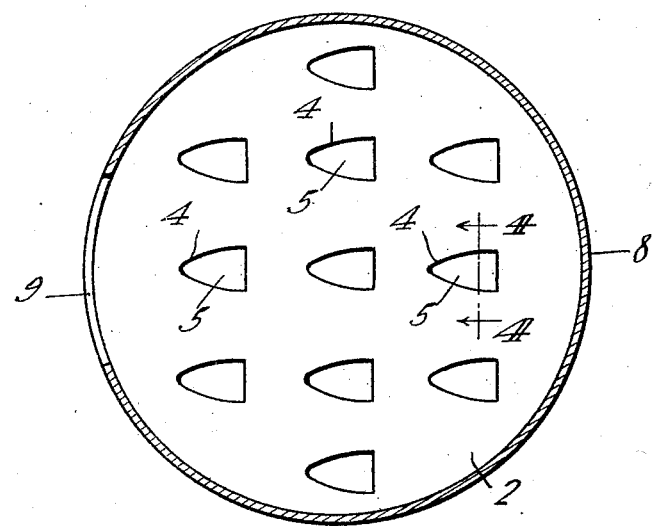
Fig. 2.
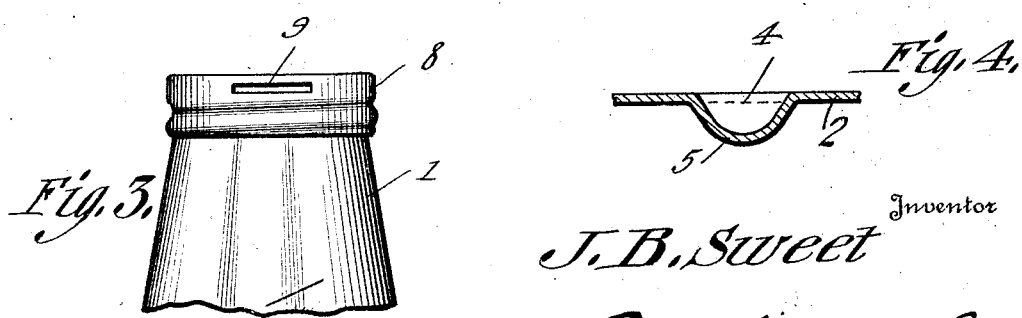
Fig. 3.
Fig. 4.
Inventor
J. B. Sweet
By C. A. Snow & Co.
Attorneys

UNITED STATES PATENT OFFICE.

JEREMIAH B. SWEET, OF HUTCHINSON, KANSAS.

SHAKER.

1,411,594.  Specification of Letters Patent.  Patented Apr. 4, 1922.

Application filed March 21, 1921. Serial No. 453,934.

*To all whom it may concern:*

Be it known that I, JEREMIAH B. SWEET, a citizen of the United States, residing at Hutchinson, in the county of Reno and State of Kansas, have invented a new and useful Shaker, of which the following is a specification.

This invention aims to provide novel means for controlling the flow of a condiment, such as pepper, sugar or salt, from a holder, novel means being provided for protecting the contents of the holder against moisture.

In the drawings:—Figure 1 shows in longitudinal section, a device constructed in accordance with the invention; Figure 2 is a section on the line 2—2 of Figure 1; Figure 3 is a fragmental elevation; Figure 4 is a section on the line 4—4 of Figure 2.

The numeral 1 marks the body portion of a salt or pepper shaker. A cap is provided, and includes an end wall 2, and a rim 3 which may be threaded on the body 1. The end wall 2 is struck inwardly as at 5, to form approximately triangular recesses 4 and to define openings 6 at the ends of the recesses, the axes of the openings being disposed substantially at right angles to the axis of the cap. Owing to the way in which the openings 6 are located, the flow of condiment is governed and controlled.

In order to keep moisture from finding its way too readily into the body of the holder, an inverted cup-shaped shield may be used if desired. The shield comprises an imperforate end wall 7 and a rim 8 which may be threaded on the rim 3 of the cap, although any other means may be provided for holding the shield in place. In the rim 8 of the shield, there is formed a lateral discharge opening which may be an elongated slot 9, the inner wall of which is flush with the outer surface of the part 2 of the cap.

Owing to the way in which the openings 6 are formed, the flow of condiment is governed and controlled, as hereinbefore stated. The shield works to keep moisture out of the holder. The condiment, having been received in the recesses 4, is directed toward and out of the slot 9 when the shaker is operated.

I claim:

A condiment holder embodying a cap struck inwardly to define recesses and to form openings at the ends of the recesses, the axes of the openings being disposed substantially at right angles to the axis of the cap; and an inverted cup-shaped shield surrounding the cap and having a lateral discharge opening.

In testimony that I claim the foregoing as my own, I have hereto affixed my signature.

JEREMIAH B. SWEET.